Patented Feb. 10, 1931

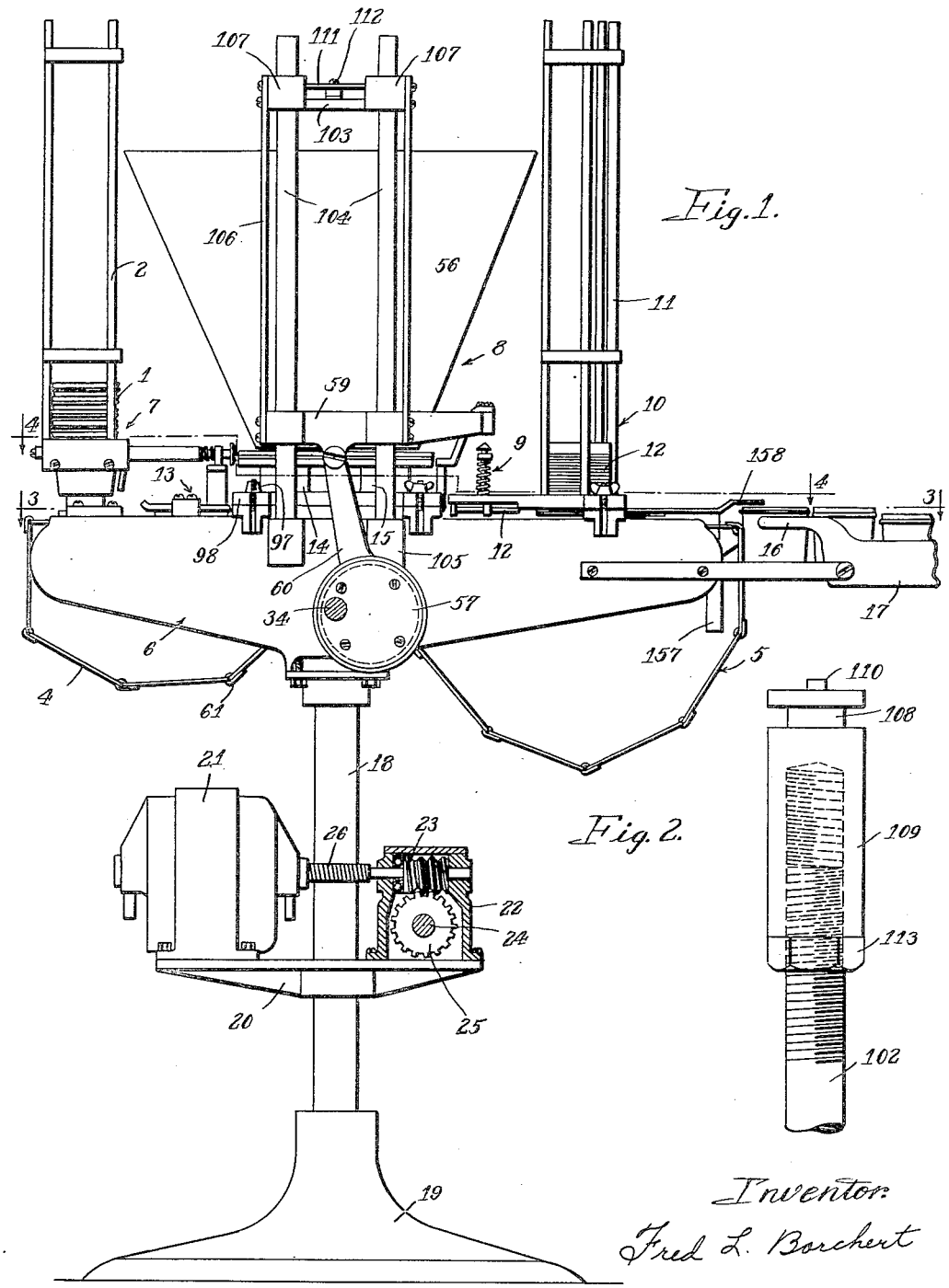

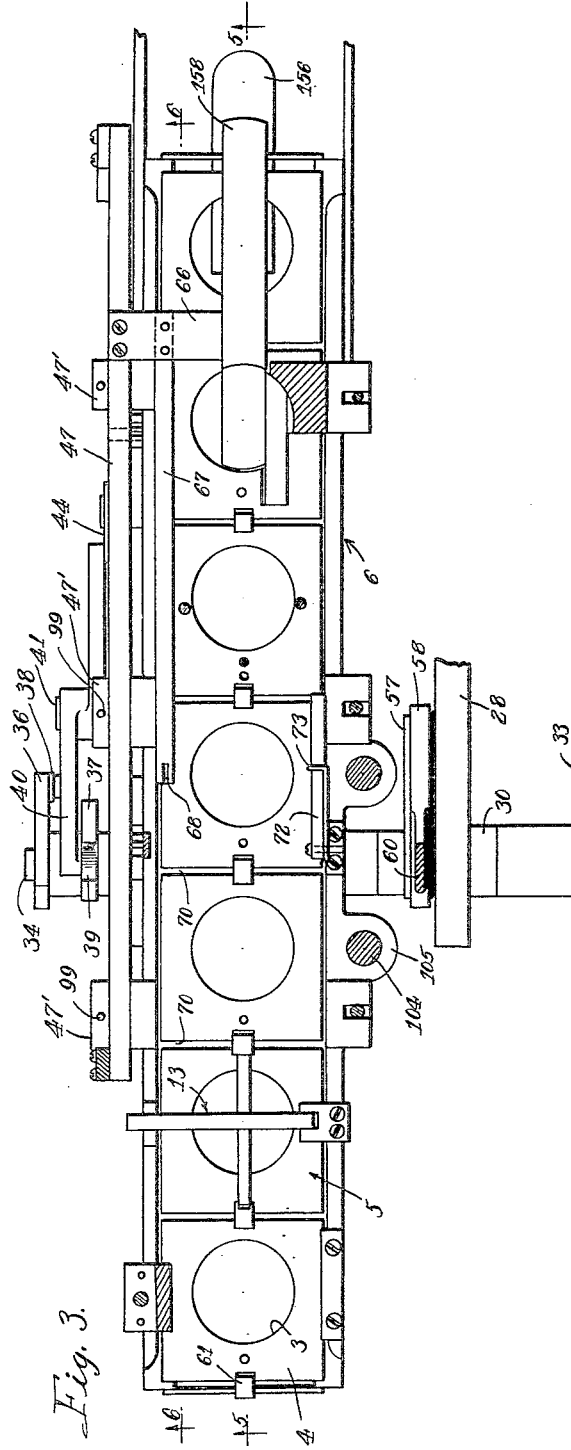
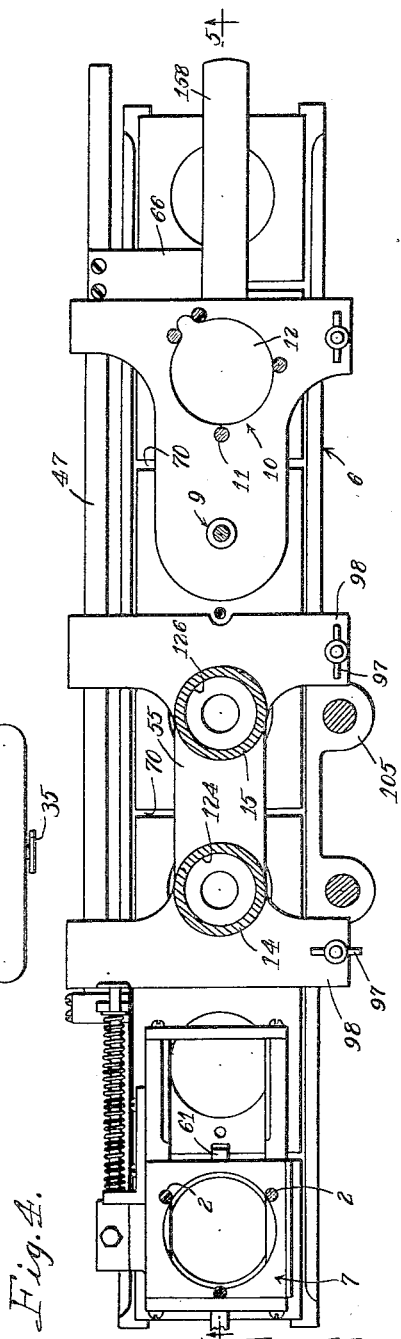

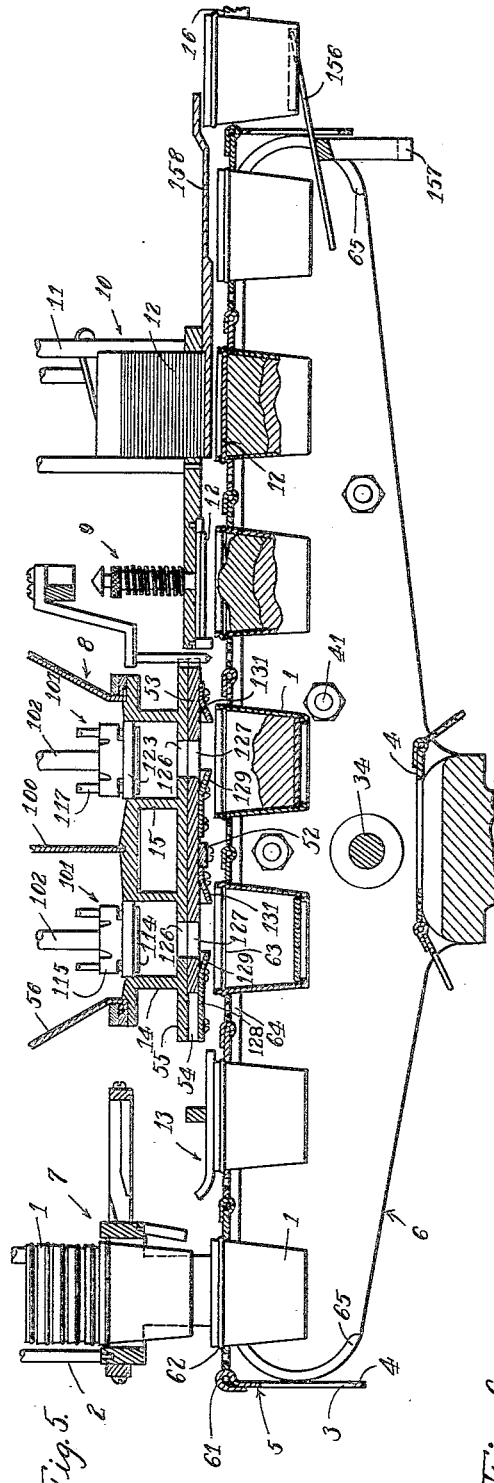

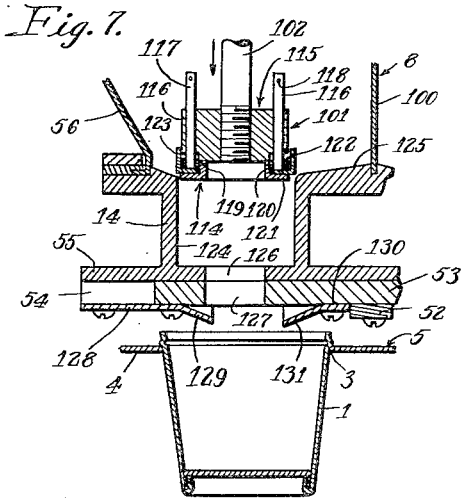
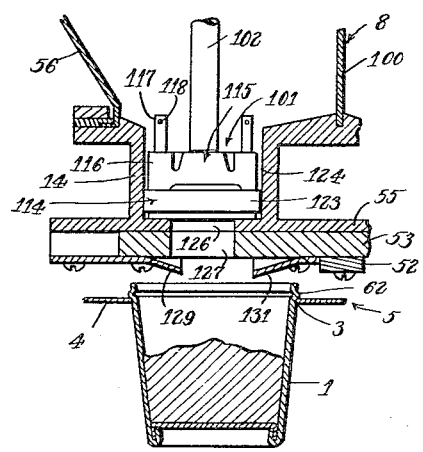
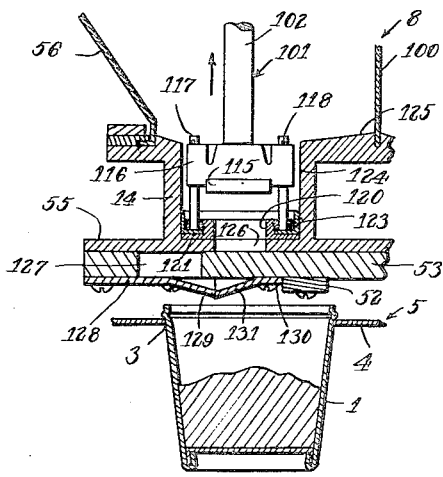
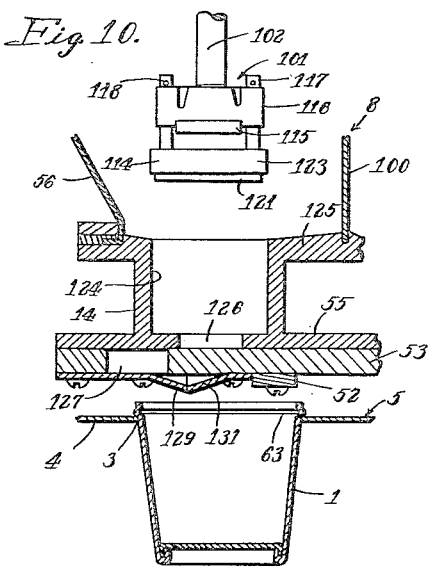

1,791,611

UNITED STATES PATENT OFFICE

FRED L. BORCHERT, OF ROCKFORD, ILLINOIS

FILLING MACHINE

Original application filed December 2, 1925, Serial No. 72,618. Divided and this application filed June 20, 1927. Serial No. 199,971.

This application is a division of my application Serial # 72,618 filed December 2, 1925.

This invention relates generally to dispensing apparatus and more particularly to a machine for filling cups or other suitable containers with a measured amount of one or two kinds of ice cream or sherbet and cream for future delivery to the ultimate consumer.

Among the more important objects of the present invention are to provide a machine which:

Firstly, performs the work specified in an absolutely sanitary manner and with extreme rapidity for volume production in factories or stores.

Secondly, dispenses the ice cream or sherbet and cream without in any way affecting the quality and merchantability of the cream but making the same available to the consumer in a handier and more appetizing form.

Thirdly, embodies a novel form of filling mechanism which accurately measures and dispenses the cream or sherbet and cream in the desired proportions, and Fourthly, embodies novel means whereby discharge of the cream is cut off clean at the end of each dispensing operation so as to avoid dripping and the consequent messing of the machine or the containers being filled therein.

The invention embraces still further objects and advantages which will become apparent to one skilled in the art to which this invention relates during the course of the following specification in which reference is made to the accompanying drawings, wherein—

Fig. 1 is a front view of the machine of the present invention, the driving connection from the motor being removed and the gearing transmission casing being shown in section;

Fig. 2 is an elevational detail on an enlarged scale of an adjustable connection provided for the cream dispensing pistons with their operating cross head;

Fig. 3 is a horizontal longitudinal section through the machine on a slightly enlarged scale taken in the plane of the line 3—3 of Fig. 1;

Fig. 4 is a similar section taken on the line 4—4 of Fig. 1;

Fig. 5 is a central vertical longitudinal section through the machine taken on the line 5—5 of Figs. 3 and 4;

Fig. 6 is another vertical longitudinal section taken on the line 6—6 of Fig. 3;

Figs. 7 to 10 inclusive are further enlarged central vertical sectional details of the filling mechanism illustrating the complete cycle of operations involved in filling the cups with measured amounts of cream or sherbet, only one of the two dispensing and measuring cylinders used being shown.

Throughout the views the same reference numerals are applied to corresponding parts.

The machine of the present invention is designed to produce what are known to the trade as packaged sundaes which are individual cups intended for delivery to the ultimate consumer primarily as a handy confection for home or picnic consumption. The cups or other containers suited for this purpose are preferably of waxed paper which are relatively inexpensive and intended to be thrown away after they have served their purpose. Ice cream of one or two kinds or sherbet and cream is filled in the cups in a semi-frozen, whipped, creamy condition as it comes from the freezer, and the filled cups, sealed with caps as they come from the machine at the factory, are placed in cans to go into the hardening room. The cream or sherbet and cream are eventually delivered to the ultimate consumer in the individual packages from which the caps are easily removable preferably with a tab provided thereon. Where both sherbet and cream or cream of two flavors are filled in the cups, the proportions may be varied as desired or the cup as it is fed through the machine may first be half filled with sherbet or ice cream of one flavor and then filled to the top with ice cream of another flavor or, if but one flavor is to be used, both stages of filling will of course be carried on with the same cream to result, in either event, in filled cups which are not only handy for the consumer but present the cream in an appetizing fashion.

Referring to the drawings, the cups or other suitable containers 1 are fed one by one from a holder or magazine 2 into the openings 3 provided in plates 4 of an endless linked carrier or belt 5. The latter, as will presently appear, is fed step by step from end to end of a frame 6 which constitutes a unitary support for the cup dispenser 7, of which the holder 2 forms a part, the cream dispensing mechanism 8, the capping mechanism 9, and the cap dispenser 10 comprising a holder 11 for caps 12. For the purposes of a general understanding of the invention at the outset, it will suffice to state that the cups after entering the carrier pass beneath a rider 13 and by keeping the same elevated prevent the stoppage of the machine. Upon a failure of the cup supply when the rider is not elevated, the machine automatically stops and the supply must be replenished before continuing operation. After passing the rider, the next station reached by the cup is beneath the first measuring cylinder 14 from which a measured amount of sherbet is dispensed into the cup in case the cups are to be filled with sherbet and cream. The next station is beneath the second and last measuring cylinder 15 from which another measured amount of cream is dispensed into the cup sufficient to fill the same. It is obvious that where cream alone is dispensed of different flavors one flavor will be dispensed from the cylinder 14 and the other from the cylinder 15, or in case only one flavor is to be used, the one cylinder will operate to supply half of the cream and the other cylinder the other half. However, in the case of different flavors of cream or in the dispensing of sherbet and cream, it is intended to provide for any desired variation in the proportions of the two materials. The filled cup at the next station after leaving the cylinder 15 is closed with a cap 12 by the capping mechanism 9 and in the course of three more step by step advances of the carrier 5 enters upon fingers 16 extending toward the machine from a chute 17. The filled cups are removed from the chute 17 and placed into cans which are removed to a hardening room. The production of the filled cups goes on at a rapid rate, as many as forty-five cups being filled per minute.

The frame 6 is supported on a pedestal 18 having an ample base 19. The column of the pedestal supports a bracket 20 on which a motor 21 is mounted. A gearing transmission casing 22 on the bracket 20 provides bearings for a worm 23 and a shaft 24 having a worm gear 25 fixed thereon and meshing with the worm 23. A heavy coiled torsion spring 26 provides a flexible drive coupling connection for the motor 21 with the worm 23. A sprocket on the projecting end of the shaft 24 drives a chain operating within a guard 28 shown in Fig. 3. A driven sprocket has a hub 30 providing clutch jaws to receive clutch teeth on the hub of a hand wheel 33.

The hand wheel 33 is suitably keyed or splined to the main drive shaft 34 to permit manual turning over of the machine when the occasion arises. A push button 35 at the center of the hand wheel 33 controls a clutch mechanism (not shown) so that when depressed the driven sprocket drives the shaft 34 through the hub of the hand wheel 33. A light pressure by the hand on the wheel 33 causes the latter to release the clutch and stop the machine. On the other hand, any excessive resistance imposed to the operation of the machine as, for example, by the dropping into operative position of the rider 13, or by the introduction of anything in an operating part will also result in a releasing of the clutch so that the machine stops instantly in such an eventuality. Thus, if the operator should accidentally get his hand caught in an operating part, no injury can result. At the same time if something gets caught in the machine which would otherwise result in a jamming and breakage of parts, the machine will instantly stop and the trouble may be taken care of. The details of the clutch form a part of a copending application Serial No. 199,972, filed June 20, 1927.

A pair of cam disks 36 and 37 are fixed on the shaft 34 and have rollers 38 and 39, respectively, operating on the peripheries thereof. These rollers are carried on studs on offsets on opposite sides of a rocker arm 40 pivoted at 41 to the side of the frame 6. The free end of the rocker arm 40 bears a pin 42 operating in a slot 43 in one arm of a bell crank lever 44, the other and longer arm of which has a slotted end 45 receiving a pin 46 to reciprocate a slide 47 in guides 47' provided in bosses projecting from the side of the frame 6. The operation of the cams 36 and 37 results in oscillation of the rocker arm 40 and through it also of the bell crank lever 44 which in turn transmits positive back and forth reciprocation to the slide 47. The slide 47 is an operating part of principal importance in the machine as it has connections with most of the operating mechanisms hereinafter described.

A third cam disk 48 is fixed on the shaft 34 and has a roller operating on the periphery thereof to oscillate a rocker arm 49 which is held with the roller normally in contact with the periphery of the cam by a tension spring 50. The rocker arm 49 is pivoted to the side of the frame 6. The opposite forked end of the arm 49 receives a pin 51 on an arm 52 secured to and extending from the side of a slide 53 operating in guides 54 provided in a base 55 on which the hopper 56 is mounted and in which the cylinders 14 and 15 are provided. The slide 53, as will presently appear, controls the dispensing of cream from the mechanism 8. It will appear that the cam 48 will serve to operate the rocker arm 49 to move the slide fairly rapidly in one direction as the roller on the rocker arm rides over the nose of the cam. When the relief portion of the cam eventually arrives opposite the roller, the spring 50 snaps the slide back to its initial position. As will presently appear, these are movements of the slide corresponding respectively to the closing and opening of the dispensing ports.

At the opposite side of the machine, an eccentric disk 57 is fixed on the shaft 34 and operates in a strap 58 to give vertical reciprocation to a cross-head 59 through a pitman rod connection 60. The cross-head 59, as will hereinafter appear, operates the dispensing pistons in the dispensing mechanism 8.

*Carrier advancing means*

The endless carrier 5, as previously stated, comprises a plurality of plates 4 linked together, as indicated at 61, preferably by the interlooping of tongues on each of the plates with openings in the adjacent edges of the next plates and turned over to form eyelets. The plates are stamped from sheet metal stock and give complete support to the cups for the filling and capping operations so that they will not crumple. The circular openings 3 receive the cups with the annular bead 62 provided on the cups at the rim thereof engaging about the openings. The caps 12 are impressed into the mouths of the cups for sealing engagement in the annular groove 63 afforded on the inside wall of the cups due to the annular bead 62. The plates 4 of the carrier 5 rest flat on tracks 64 provided at opposite sides of the carrier in the frame 6. The tracks 64 are straight and merge with curved tracks 65 at opposite ends of the frame 6 where the plates 4 enter upon and leave the tracks 64. The slide 47 has a cross-arm 66 fixed thereon to which a rod 67 parallel with the slide 47 is fixed and arranged to reciprocate with the slide over the carrier 5 at one side of the frame 6. The free end of the rod 67 has a latch 68 pivoted thereto which has a tooth 69 at its free end arranged to ride into the spaces indicated at 70 which occur between the adjoining edges of the plates 4 of the carrier 5. The latch is urged toward the carrier by a light spring 71. Another latch or pawl 72 is pivoted at the opposite side of the frame and is similarly urged into engagement at its free end in the spaces 70 by a light spring 73. The latch 68 advances the carrier step by step and the latch 72 serves merely to retain the carrier at each step. Thus viewing Figs. 3 and 6, when the slide 47 moves to the left the latch 72 holds the carrier against backward movement. On the return stroke of the slide, the latch 68, which has moved to the next space 70 the width of one plate apart from its former position, advances the entire carrier and its contents to the right one step and at the limit of its movement the latch 72 drops into engagement in the same space with the latch 68 and thereby retains the carrier in its new position until a succeeding advancing movement. In the step by step progress of the carrier in steps equal to the width of any one of the plates 4 the cups 1 are advanced from station to station through the cycle of operations described above.

*Cup dispensing mechanism*

So far as the cup dispenser 7 is concerned, it will suffice for the present purpose merely to state that cups are fed one by one in proper relation to the advancing of the carrier step by step so that each plate of the endless chain carrier is provided with a cup which it carries from one end of the frame 6 to the other through the course of the operations first above described. The cup dispenser herein shown is fully described in my copending application above referred to and is of a reciprocating type operated by the slide 47 to dispense one cup from the stack on each movement of the slide 47 to the left from the position thereof shown in Figs. 3–6. Obviously then, as the slide 47 moves to the right and advances the carrier, it brings up into position another link of the carrier beneath the cup dispenser, which link is supplied with a cup on the return stroke of the slide.

*Cream dispensing mechanism*

The cups, after passing the rider 13, pass in two steps under the cream dispensing mechanism 8 to be partly filled first with sherbet and then filled to the top with cream or, if desired, to be partly filled first with one flavor or, in case only one flavor is to be used, the cup will first be half filled at the cylinder 14 and receive the other half portion at the cylinder 15. The proportions filled at the two cylinders may be varied as desired, as will presently appear.

Considering first the construction of the dispensing mechanism, it will be noted that the base 55 is fastened on the frame 6 by the tightening of two wing nuts 97 on eye bolts pivoted to the frame 6 that enter into slots in the lugs 98 at opposite sides of the base 55. The base 55 is positioned in proper relation to the carrier 5 on the frame 6 as by means of dowels 99 received in the guides 47' of the slide 47 (see Fig. 3). The dispensing mechanism is thus quickly detachable as a unit from the machine for the purposes of cleaning and sterilizing. The hopper 56 has a middle partition 100 dividing the hopper into two compartments in each of which a dispensing piston 101 is arranged to operate. The latter have rods 102 extending vertically out of the mouth of the hopper for connection with a cross-head 103. The cross-head 103 slides on guide rods 104 mounted in bosses 105 in the frame 6 and is connected with the cross-head 59 by strips 106 so as to reciprocate vertically with the cross-head 59. The latter, as previously described, is operated from the eccentric 57 which is driven with the main drive shaft 34. The cross-head 103 constitutes a yoke having spaced slotted heads 107 to receive the reduced necks 108 provided on adjustable tappets 109 threading on the externally threaded ends of the rods 102. Small knobs 110 are provided on the ends of the tappets 109 which are received in openings in the opposite ends of a leaf spring 111 fastened at its mid-point by a screw 112 to the cross-head 103. By flexing the leaf spring 111 off the knobs 110, it is possible to remove the rods from their connections with the cross-head in an obvious manner. The removing of the rods and the pistons connected therewith is necessitated when it is desired to remove the hopper from the machine and of course enables the cleaning of the rods and pistons. The tappets 109 due to their threaded connection with the rods afford adjustability of the effective length of the rods. Lock nuts 113 are provided threading on the rods 102 to jam up against the bottom of the tappets 109 to lock the rods in their adjusted condition, as most clearly shown in Fig. 2. The shortening or lengthening of the rods 102 determines the depth to which the pistons 101 will be moved into the cylinders 14 and 15 and thereby determines the amount of cream or sherbet dispensed, as will more clearly appear in the following discussion.

The pistons 101, as most clearly appears in Figs. 7 to 10 inclusive, are of the valved type and comprise a piston part proper designated by the reference numeral 114 and a valve part designated by the numeral 115. The valve part 115 is generally cylindrical in form and threads on the lower end of the rod 102 and provides guides 116 at opposite sides for pins 117 which fit relatively freely therein and are connected with the piston part 114. The pins 117 provide a lost motion connection between the piston part 114 and the valve part 115 limited by cotter pins 118. The valve 115 is arranged to engage a seat 119 about a central opening 120 in the head 121 of the piston part 14. The head 121 has threaded connection with a ring 122 which bears the pins 117 and, by the threaded connection, a cup leather packing 123 is clinched in the piston part 114 with the lip of the cup leather extending outwardly relative to the bore 124 of the measuring cylinder 14 or 15 as the case may be. The pistons 101 are guided into the bores 124 partly by the fact that the bottoms 125 of the hopper compartments slope toward the bores of the cylinders and partly because the mouth of the bore 124 is rounded and the cup leather 123 is relatively yielding and conformable and will slip easily into the bore. The pistons are not rigid with their rods on the cross-head 103 but are intended to be self-centering in the bores of the cylinders and exact alignment is not necessary to the nicety of performance of the machine. Furthermore, the pistons operate in and are lubricated practically by the cream. At the same time, the cream, since it is at all times on both sides of the piston in the hopper compartments and in the measuring cylinders, forms a perfect liquid seal for the pistons. The operation is smooth and noiseless. All of the metal parts coming in contact with the cream are tinned to avoid any deterioration and consequent contamination of the cream. The provision of the cup leather packings eliminates the rubbing together of metal parts which, as is well-known in the art, is objectionable since the tin surface rubs off and blackens the cream. Where the pins 117 slide in the guides 116, the fit is so loose and the relative movement so small that there is no objectionable rubbing off of the tinned surface of the brass parts. The sloping of the bottoms of the hopper compartments and the sloping of the side walls of the hopper induce the cream to flow toward the mouth of the bores of the measuring cylinders without the necessity for any collecting and agitating paddles to concentrate the cream at the desired points.

The measuring cylinders have dispensing ports 126 arranged to register with ports 127 in the slide 53 above referred to. When the ports are in register, as shown in Figs. 7 and 8 the cream in the cylinder drops down into the cup ready to receive it. The pistons, as will more clearly appear hereinafter, measure the amount segregated from the main supply and, while the cream drops mainly by gravity in a haphazard clump or heap in the cup, it is discharged in a certain sense by the piston which follows the cream and clears the cylinder so that exactly the same amount of cream or nearly so is discharged at each operation. At this point, it may be remarked that the machine will dispense any fluid or plastic materials other than ice cream or sherbet such, for example, as fruits, vegetables, cheese, butters, syrups, and the like.

The slide 53, as above described, operates in guides 54 in the base 55 of the cream dispensing mechanism. Plates 128 are secured to the bottom side of the base 55 and form a complementary side of the guide 54 and keep the slide 53 assembled with the base when the hopper is removed from the machine. A lip 129 is provided by a curved depression at one end of each plate 128. Another plate 130 is fixed to the slide 53 and has a similar lip 131 facing the lip 129 arranged to be brought into engagement with the latter, as shown in Figs. 9 and 10, to nip off any cream depending from the cylinder that has failed to drop into the cup due to the rapidity with which the operation is carried out and because of the viscosity of the cream. This nipping off of any adhering clot of cream avoids the messing of the machine by drippings. Each of the measuring cylinders, it will be noted, is equipped with the nippers 129 and 131.

In the operation of the mechanism described, the parts assume the relative positions shown in the complete cycle of operation illustrated in Figs. 7 to 10 inclusive. In Fig. 7, the measuring cylinder 14 is completely charged with cream and the piston rod 102 is traveling downwardly as indicated by the arrow. The piston part 114 upon encountering the cream in the cylinder closes with the valve part 115 and the two parts move into the cylinder together. The opening of the port 126 by the slide 53 having its port 127 coming in register with the port 126, is timed to occur at about the instant when the piston 101 is in the position shown. This is a factor in determining the measuring of the amount of cream dispensed. The piston in moving to the position shown in Fig. 8 clears the cylinder of all of the cream contained therein, the cream being expelled partly by the piston following it and partly by mere gravity. In Fig. 8 it will be noted that the piston has moved to the extreme bottom of the cylinder. If, however, the effective length of the rod 102 is varied by the means shown in Fig. 2 as previously described, the piston may be made to stop short of the bottom of the cylinder so as not to expel as large an amount of cream. Substantially as soon as the piston reaches the bottom of its stroke, whether it moves to the extreme bottom of the cylinder or not, the port 126 is closed, as shown in Fig. 9. Otherwise the measuring of the amount of cream dispensed could not as well be accurately predetermined by the adjustment in the effective length of the rods 102 because all of the cream would tend of itself to drop by gravity out of the cylinder. In Fig. 9 it will be noted that the rod 102 has commenced its upward travel. The friction resulting between the cup leather packing 123 and the cylinder wall causes the movement of the valve part 115 away from the piston part 114 thus leaving the opening 120 uncovered. As the piston assembly 101 rises out of the bore of the cylinder there is a certain amount of suction created in back of it and cream is forced down by atmospheric pressure through the opening 120 in back of the piston completely filling any void in the cylinder. The piston assembly 101 rises clear away from the mouth of the bore 124 to the position shown in Fig. 10 so that cream is quite free to flow into and fill the measuring cylinder. The succeeding down stroke of the piston assembly brings the parts thereof ultimately to the position shown in Fig. 7 at which instant the port 126 is again opened and the cycle of operations above described is repeated, a measured amount of cream being dispensed in each cycle of operation. At no stage of the dispensing operation is the cream subjected to any appreciable pressure and the condition of "knocking the air out", as it is known to the trade, does not arise and there is no compression and resultant loss to the manufacturer and the consumer does not get a heavier and less creamy product. The product is absolutely free from large water crystals and is perfectly smooth to the palate. It is noted in Figs. 7 to 10 that the cup after having the measured amount of cream dispensed thereto as shown in Fig. 8, remains under the measuring cylinder until the port 126 is closed and any adhering clot of cream is nipped off by the nippers 129 and 131. As soon as that occurs, the carrier 5 is advanced one step to bring a new cup into position for the succeeding operation, as indicated in Fig. 10.

The operations above described are also clearly shown in Fig. 5 from which a better understanding of the cooperation of the two measuring cylinders may be gotten. Thus in Fig. 5 the cup beneath the cylinder 15 corresponds to that shown in Figs. 8 and 9 which has been advanced from the cylinder 14 where it received its initial charge of cream or sherbet as the case may be. The parts in Fig. 5 are shown in approximately the position shown in Fig. 7 when the cream is being discharged from the measuring cylinders into the cups.

*Cap dispensing and applying mechanism*

The cups, immediately after filling, are capped by the mechanism 9, or more exactly when one cup is receiving its last charge of cream the cup last filled is being capped. The two operations are carried out simultaneously.

The details of the cap dispensing and applying mechanism are fully set forth in my copending application first above referred to. It will therefore suffice for the present purpose merely to state that in each movement of slide 47 to the left one of the caps is fed to the mechanism 9 and when the dispensing pistons are moved on the down stroke, the cap which has been dispensed is applied to a cup disposed beneath the mechanism 9. In the same stroke of the dispensing pistons and just prior to the actual application of the cap, the carrier link supporting the cup is accurately registered in relation to the capping plunger as fully set forth in the copending application.

The filled cups after the capping, ride up onto an inclined finger 156 beneath the carrier 5 which is supported on a bracket 157 secured to the end of the slide 47. The finger 156 therefore reciprocates with the slide 47. In riding up the inclined finger the cups are slightly raised out of their engagement in the openings in the plates 4 just before leaving the machine to enter upon the chute 17 on the finger 16. Another finger 158 is provided to prevent tipping over of the cup when raised and delivered out of the machine onto the finger 16 of the chute 17. With the cups raised slightly, the plates 4, as the carrier 5 is advanced to the position shown in Fig. 5, fall free of the cups and the finger 156 extends out through the opening in the plates while supporting the cups and presenting them to the chute. The cups rest on the entering end of the chute until shoved along by the next cup and are removed by hand or otherwise from the far end of the chute to be placed in cans for removal to a hardening room.

It is believed that the foregoing conveys a clear understanding of the objects prefaced above, and while I have illustrated but a single working embodiment, it should be understood that changes might be made in details of construction without departing from the spirit and scope of the invention as expressed in the appended claims.

I claim:

1. In a machine of the character described, an endless carrier for feeding containers to be filled, means for advancing said carrier step by step continuously in one direction, a plurality of dispensing cylinders disposed above said carrier in spaced relation to one another so that the containers are fed from one to another in the step by step movement of the carrier, plungers operating in said cylinders, interconnected valves controlling the discharge from said cylinders, means for operating said valves in timed relation to the movement of said carrier, and a plurality of nippers also inter-connected for joint operation arranged in the closing of said valves to cut off any dispensed material left protruding when the valves close.

2. In a dispensing machine, a dispenser having a discharge port, a slide valve for closing said port, and a pair of nippers outside of the dispenser for cutting off any dispensed material which may be left protruding when the valve closes, one of the nippers being stationarily mounted and the other being movable with the slide valve toward the stationary nipper.

3. In a filling machine for the dispensing of ice cream or similar material, means for supporting a receptacle to be filled, a hopper adapted to contain ice cream in a semi-frozen, creamy condition having a dispensing cylinder in communication with the lower portion thereof and disposed above the support, a dispensing piston reciprocating vertically and arranged to enter said cylinder from said hopper, a valve controlling the discharge from the lower end of said cylinder, and means for operating said piston and valve in such timed relation that the valve is opened at the instant the piston enters the cylinder on its down stroke and is closed at the instant the piston reaches the lower end of its stroke, whereby a measured amount of cream is dispensed into the receptacle principally by gravity and without the application of pressure by the piston, the piston being arranged merely to follow the cream in the exit thereof from the cylinder so as to clear the cylinder of cream.

4. In a machine as set forth in claim 3 wherein the means for reciprocating said piston is arranged to give the same a uniform stroke at all times, the provision of an adjustable connection for said piston therewith whereby to permit variation of that portion of the length of the stroke made by the piston in the cylinder, and thereby vary the amount of material measured and discharged.

5. In a dispensing machine comprising a dispensing cylinder, a valved piston operating in said cylinder arranged to close in one stroke and open in the reverse stroke, said piston comprising a body portion providing a valve element mounted on the piston rod, said body portion having guideways therein, rods fitting in said guideways having means for limiting the movement thereof in the opening of the valve, and a ring-shaped packing element mounted on said rods, said element being arranged to be slidably received in the cylinder bore and providing a valve seat for engagement by the valve element.

6. A structure as set forth in claim 5 wherein the packing element comprises a two-part ring, the one part of which threads onto the other part, and has the guide rods fixed thereto, a cup-leather washer for sealing the packing element in the cylinder bore having a portion thereof arranged to be clamped between the two parts in the threading thereof together.

7. In a machine of the character described, a frame, a support thereon for cups or other receptacles to be filled, a hopper disposed over the support and arranged to contain the material to be dispensed, the said hopper having a measuring and dispensing cylinder on the lower portion thereof, means for detachably mounting said hopper and cylinder on said frame to permit the easy removal thereof, a piston operating in said cylinder, a reciprocating slide valve mounted in guides on the cylinder to control a discharge port therefor, means on said frame for reciprocating said valve having a quickly detachable operating connection therewith, and a pair of nippers, one of which is stationarily mounted relative to the cylinder and the other of which is movably mounted with respect thereto on the valve to close and open in the closing and opening of the valve.

8. In a machine of the character described, a frame, a support thereon for cups or other receptacles to be filled, a hopper disposed over the support and having a plurality of compartments adapted to contain materials to be dispensed, the said compartments having measuring and dispensing cylinders communicating with the lower portion thereof, means for detachably mounting said hopper on said frame to permit the easy removal thereof, pistons operating in said cylinders, a multi-port slide valve mounted in guides on the hopper to control discharge ports for said cylinders, means on said frame for reciprocating said valve having a quickly detachable operating connection therewith, and a pair of nippers for each of the valve ports, one of each of which pairs is stationarily mounted relative to the cylinder, and the other of which is movably mounted with respect thereto on the valve to close and open in the closing and opening of the valve.

9. In a machine of the character described, a frame, a support thereon for cups or other receptacles to be filled, a hopper disposed over the support and having a plurality of compartments adapted to contain materials to be dispensed, the said compartments having measuring and dispensing cylinders communicating with the lower portion thereof, means for detachably mounting said hopper on said frame to permit the easy removal thereof, pistons operating in said cylinders, a multi-port slide valve mounted in guides on the hopper to control discharge ports for said cylinders, means on said frame for reciprocating said valve having a quickly detachable operating connection therewith, and a blade for each of the valve ports, said blades being mounted on and movable with the valve in the closing and opening thereof and being so disposed with respect to the ports to cut off any dispensed material which may be left protruding when the valve closes after a dispensing operation.

10. In a machine for the dispensing of ice cream or similar material having means for supporting a receptacle to be filled, a dispensing cylinder adapted to be filled with ice cream in a semi-frozen, creamy condition, and disposed above the support, a dispensing piston reciprocating vertically into and out of said cylinder from above the same, a valve controlling the discharge from the lower end of said cylinder, and means for operating said piston and valve in such timed relation that the valve is opened at the instant the piston enters the cylinder on its down stroke and is closed at the instant the piston reaches the lower end of its stroke, whereby a measured amount of cream is dispensed into the receptacle principally by gravity and without the application of pressure by the piston, the piston being arranged merely to follow the cream in the exit thereof from the cylinder so as to clear the cylinder of cream.

11. In a machine as set forth in claim 10 wherein the means for reciprocating said piston is arranged to give the same a stroke of uniform length, the provision of an adjustable connection for said piston therewith whereby to permit changing the depth to which the piston is moved in the cylinder and thereby change the amount of material measured and discharged.

In witness of the foregoing I affix my signature.

FRED L. BORCHERT.